US011379851B2

(12) United States Patent
Chakra et al.

(10) Patent No.: US 11,379,851 B2
(45) Date of Patent: Jul. 5, 2022

(54) CUSTOMIZING PRODUCT ANNOUNCEMENTS BASED ON PRODUCT USAGE

(71) Applicant: INTERNATIONAL BUSINESS MACHINES CORPORATION, Armonk, NY (US)

(72) Inventors: Al Chakra, Apex, NC (US); Jerry Stevens, Raleigh, NC (US); Matias Mendieta, Indian Trail, NC (US); Patricia Bui, Henrico, VA (US); Kaji Rashad, Fort Pierce, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 281 days.

(21) Appl. No.: 16/177,742

(22) Filed: Nov. 1, 2018

(65) Prior Publication Data
US 2020/0143385 A1    May 7, 2020

(51) Int. Cl.
   *G06Q 30/00*    (2012.01)

(52) U.S. Cl.
   CPC .................. *G06Q 30/016* (2013.01)

(58) Field of Classification Search
   CPC .................................................. G06Q 30/016
   See application file for complete search history.

(56) References Cited

U.S. PATENT DOCUMENTS

| 8,533,703 | B2 * | 9/2013 | Cheng ....................... G06F 8/65 717/172 |
| 8,606,601 | B2 | 12/2013 | Shen |
| 8,694,965 | B2 | 4/2014 | Eykholt |
| 9,122,667 | B2 | 9/2015 | Vasey |
| 2005/0192099 | A1* | 9/2005 | Nguyen ............... G07F 17/3232 463/42 |
| 2012/0101952 | A1* | 4/2012 | Raleigh ............... H04L 12/1417 709/223 |
| 2016/0249319 | A1* | 8/2016 | Dotan-Cohen ... H04M 1/72454 |
| 2017/0091313 | A1 | 3/2017 | Chalabi |

OTHER PUBLICATIONS https://www.automatedbuildings.com/news/may11/articles/sinopoli/110425011606sinopoli.html , Jim Sinopoli, 2011 pp. 1-3 (Year: 2011).*
Tang et al., "Learning Semantic Representations of Users and Products for Document Level Sentiment Classification," Proceedings of the 53rd Annual Meeting of the Association for Computational Linguistics, Jul. 26-31, 2015. pp. 1014-1023.
Ramakrishnan et al., "Layout-Aware Text Extraction from Full-Text PDF of Scientific Articles," Source Code for Biology and Medicine, 7:7, May 28, 2012, pp. 1-10.

* cited by examiner

*Primary Examiner* — A. Hunter Wilder
*Assistant Examiner* — Joseph M Mutschler
(74) *Attorney, Agent, or Firm* — Cantor Colburn LLP; Teddi Maranzano

(57) ABSTRACT

A computer-implemented method includes tracking usage history of a plurality of components of one or more products. An original set of announcements about the one or more products is received, where the original set of announcements includes a plurality of announcement records. The plurality of announcement records are prioritized based on the usage history of the plurality of components. A usage-based set of announcements is generated based on the prioritization of the plurality of announcement records.

19 Claims, 3 Drawing Sheets

CUSTOMIZING PRODUCT ANNOUNCEMENTS BASED ON PRODUCT USAGE

BACKGROUND

The present invention relates to product maintenance and, more specifically, to customizing product announcements based on product usage.

Information technology (IT) vendors provide regular product announcements about upcoming product changes. For instance, announcements may indicate that existing features are changing, being deleted, or being replaced. In some cases, new features are added, or critical features are deprecated. Product announcements are designed to keep users apprised of changes, such that users can continue using their products without interruption, and to enable users to prepare for upcoming changes that impact their products.

SUMMARY

Embodiments of the present invention are directed to a computer-implemented method for customizing product announcements. A non-limiting example of the computer-implemented method includes tracking usage history of a plurality of components of one or more products. An original set of announcements about the one or more products is received, where the original set of announcements includes a plurality of announcement records. The plurality of announcement records are prioritized based on the usage history of the plurality of components. A usage-based set of announcements is generated based on the prioritization of the plurality of announcement records.

Embodiments of the present invention are directed to a system for customizing product announcements. A non-limiting example of the system includes a memory having computer-readable instructions and one or more processors for executing the computer-readable instructions. The computer-readable instructions include tracking usage history of a plurality of components of one or more products. Further according to the computer-readable instructions, an original set of announcements about the one or more products is received, where the original set of announcements includes a plurality of announcement records. The plurality of announcement records are prioritized based on the usage history of the plurality of components. A usage-based set of announcements is generated based on the prioritization of the plurality of announcement records.

Embodiments of the invention are directed to a computer-program product for customizing product announcements, the computer-program product including a computer-readable storage medium having program instructions embodied therewith. The program instructions are executable by a processor to cause the processor to perform a method. A non-limiting example of the method includes tracking usage history of a plurality of components of one or more products. Further according to the method, an original set of announcements about the one or more products is received, where the original set of announcements includes a plurality of announcement records. The plurality of announcement records are prioritized based on the usage history of the plurality of components. A usage-based set of announcements is generated based on the prioritization of the plurality of announcement records.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
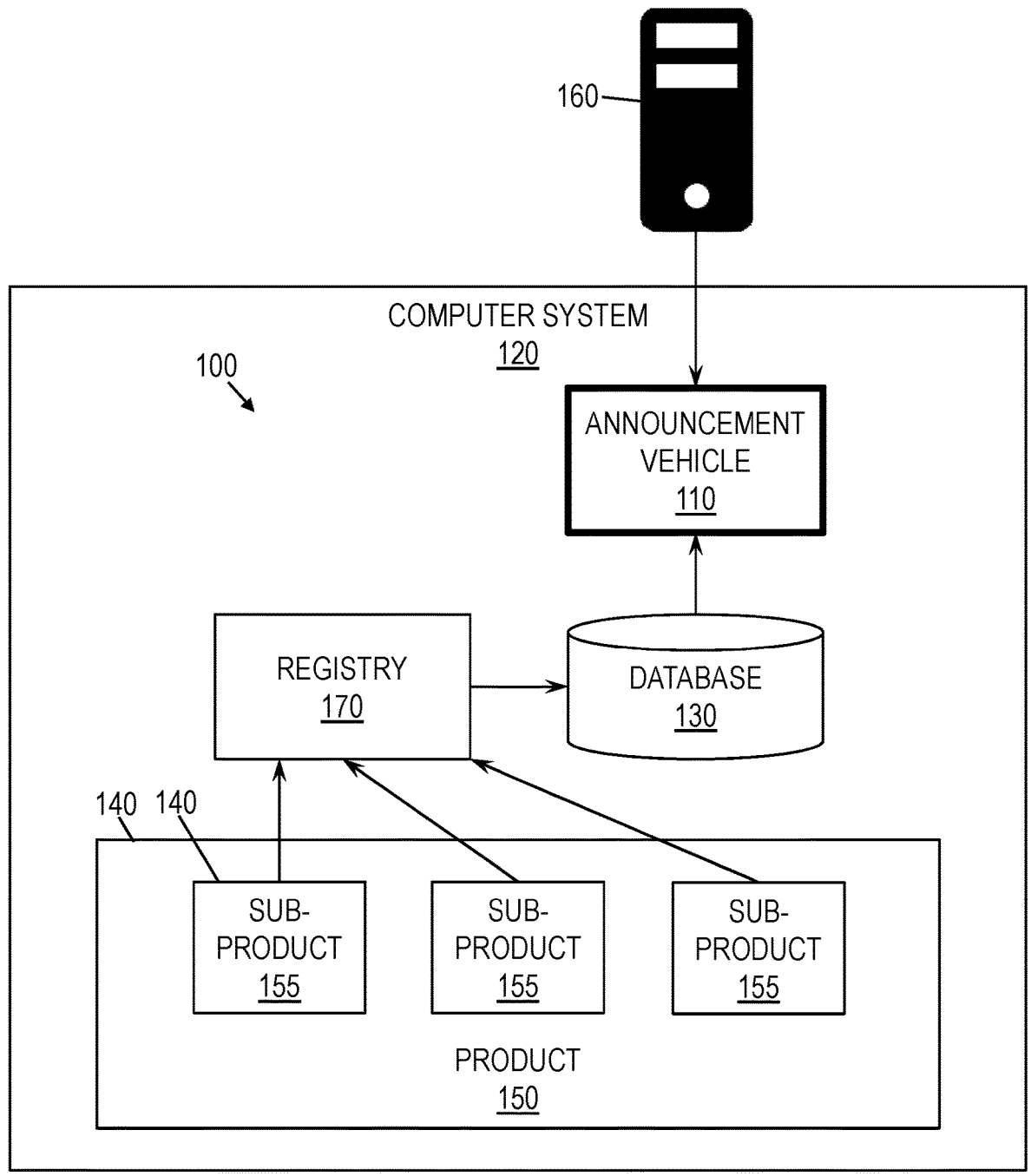
FIG. 1 is a diagram of a customization system for customizing product announcements based on product usage, according to some embodiments of this invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, the volume of information in product announcements is often too large for human consumption. While this problem is not readily obvious with respect to consumer products, such as mobile phones and notebook computers, the problem is significant for business or enterprise products, such as International Business Machines® z/OS®. An individual product with numerous components (e.g., sub-products, functions, and sub-functions) can have a significant volume of announcements. Further, a system can include multiple products with numerous components, which can lead to an overwhelming volume of product announcements. Most of the information in the product announcements, however, will not be relevant to the specific usage of a user because product announcements are not tailored. Critical announcements may be missed during manual consumption of the information in the product announcements. As a result, there may be a loss in functionality when a component on which an organization depends experiences a change. This can lead to expenses in both time and money.

Turning now to an overview of the aspects of the invention, one or more embodiments of the invention address the above-described shortcomings of the prior art by providing a mechanism to assist users in digesting product announcements. More specifically, embodiments of the invention build a database based on a local registry. The local registry describes which components of one or more products are used and when they were last used. Based on this information, a product announcement vehicle may filter and prioritize available product announcements before presenting a resulting customized version of the product announcements.

The above-described aspects of the invention address the shortcomings of the prior art by providing an improved system of providing product announcements. Embodiments of the invention allow a user to focus on product announcements, including upgrades, that are most relevant to that user's specific usage. As a result, users are less likely to miss critical updates and other announcements related to components that are actually being used, and thus, products are more likely to be kept up to date.

Turning now to a more detailed description of aspects of the present invention, FIG. 1 is a diagram of a customization system 100 for customizing product announcements based on product usage, according to some embodiments of this invention. As shown in FIG. 1, an announcement vehicle 110 may run on or may be otherwise associated with a computer system 120, which may maintain a database 130 describing tracked components 140 of products 150 that have been used on the computer system 120. The computer system 120 may include one or more computing devices, which may be co-located or may be distributed. For example, and not by way of limitation, the announcement vehicle 110 may be a piece of software installed on the computing device 120 and in communication with a server 160 of a vendor. Alternatively, however, the announcement vehicle 110 may be firmware, a specialized hardware circuit, or may be a combination of hardware, software, and firmware. The server 160 may be in communication with one or numerous announcement vehicles 110, each of which may be associated with a respective computer system 120. Through the announcement vehicle 110, the server 160 may communicate product announcements, also referred to herein as announcements, to the computer system 120.

The computer system 120 may include one or more products 150 in use on the computer system 120. Each product 150 may be hardware, software, or a combination of both. Further, each product 150 may be, but need not be, divided into components 140, which may include sub-products 155, functions, and sub-functions, for instance. The definition of a component 140 within a product 150 may be product-specific. For example, and not by way of limitation, a product 150 may be divided into sub-products 155 or into even finer levels based on functionality, based on physical division, or based on categorization. For example, and not by way of limitation, a product 150 to which the customization system 100 may apply is IBM z/OS. Thus product 150 may be divided into sub-products, such as a kernel, one or more databases, middleware, and a networking function. The networking function sub-product 155 may be divided into a set of functions, such as Transmission Control Protocol/Internet Protocol (TCP/IP), which may be divided into a set of sub-functions, such as IPv4 and IPv6. In this disclosure, each division of a product 150, such as a sub-product 155, a function, or a subfunction, is referred to as a component 140.

In some embodiments of the invention, the customization system 100 tracks the usage of at least one product 150 on the computer system 120, thus enabling the product announcements associated with that product 150 to be customized as described herein. Generally, in some embodiments of the invention, the customization system 100 tracks all components 140 of such a product 150, also referred to as a participating product 150, but alternatively, the customization system 100 may track only selected components 140. The components 140 whose usages are tracked to enable customization of product announcements are referred to herein as tracked components 140.

In some embodiments of the invention, each time a component 140 is used on the computer system 120, the use of that component 140 is written to a registry 170 on the computer system 120. For instance, an operating system of the computer system 120 may detect the use of the component 140 and, based on that detection, may update the registry 170 with a record that indicates the most recent usage. Each such record may include a component identifier of the component 140 and may include a time of the usage, including the date. Depending on the product 150, the number of components 140 registering with the registry 170 may be one or numerous. For instance, in the case of a product 150 that is an operating system, hundreds of components 140 of that operating system may register with the registry 170 upon their use. Further, if there are multiple instances of a product 150 on the computer system 120, then each such instance may have its own set of components 140 that register with the registry 170 upon use.

Based on the registry the customization system 100 may automatically generate a database 130, which includes a subset of information in the registry 170. For example, and not by way of limitation, the announcement vehicle 110 may keep the database 130 updated, or a registry tool incorporated into the customization system 100 may do so. The database 130 may include, for each tracked component 140, an indication of the usage of that component 140. For example, the database 130 includes at least an indication of the most recent usage of the component 140 as well as an indication of the frequency of use of the component 140. For instance, the database 130 may indicate all uses within a certain timeframe or that meet certain other criteria.

It will be understood that a product 150 may include hundreds or thousands of components 140, and a customer may utilize many customized instances of each such product 150 as well as other products 150 on a computer system 120. In other words, while a first instance of a product 150 may have one set of components 140 in use, a second instance of the same product 150 may have another set of components 140 in use, where those sets may or may not overlap. For example, and not by way of limitation, a first component 140 may be in use in hundreds of instances of the product 150, which a second component 140 may be in use in only fifty instances. Some of these instances may be more critical to a customer's business than others, and in some embodiments of the invention, the database 130 may maintain indications of importance of instances as well. The database 130 may thus maintain information describing each component 140 and each instance of the various products 150 being tracked. Thus, thousands of components 140 may register with the registry 170, and thousands of components 140 may thus be represented in the database 130 to indicate how each instance of each tracked component 140 is being used.

As described herein, the database 130 is utilized to customize product announcements, but the database 130 may have additional or alternative uses. In some embodiments of the invention, for instance, information in the database 130 is transmitted to one or more servers 160 associated with one or more vendors, thus providing the vendors with information about product usage. The vendors can use this information to improve products 150, improve the marketing of products, or provide new products 150.

In some embodiments of the invention, the announcement vehicle 110 receives announcements from a server 160 associated with a vendor. Although this disclosure provides examples with a single server 160 and a single vendor, it will be understood that the announcement vehicle 110 may receive announcements from multiple servers 160, which may be associated with one or more vendors. The announcement vehicle 110 may analyze the announcements received in view of information in the database 130 and, as described in detail below, may generate a usage-based set of announcements. In some embodiments of the invention, an announcement may initiate an action, such as by including a link that causes the action such as an upgrade or an uninstall. As such, by generating the usage-based set of announcements, the announcement vehicle 110 may enable a user to view relevant announcements as well as to act on those announcements in some cases.

Figure 2:
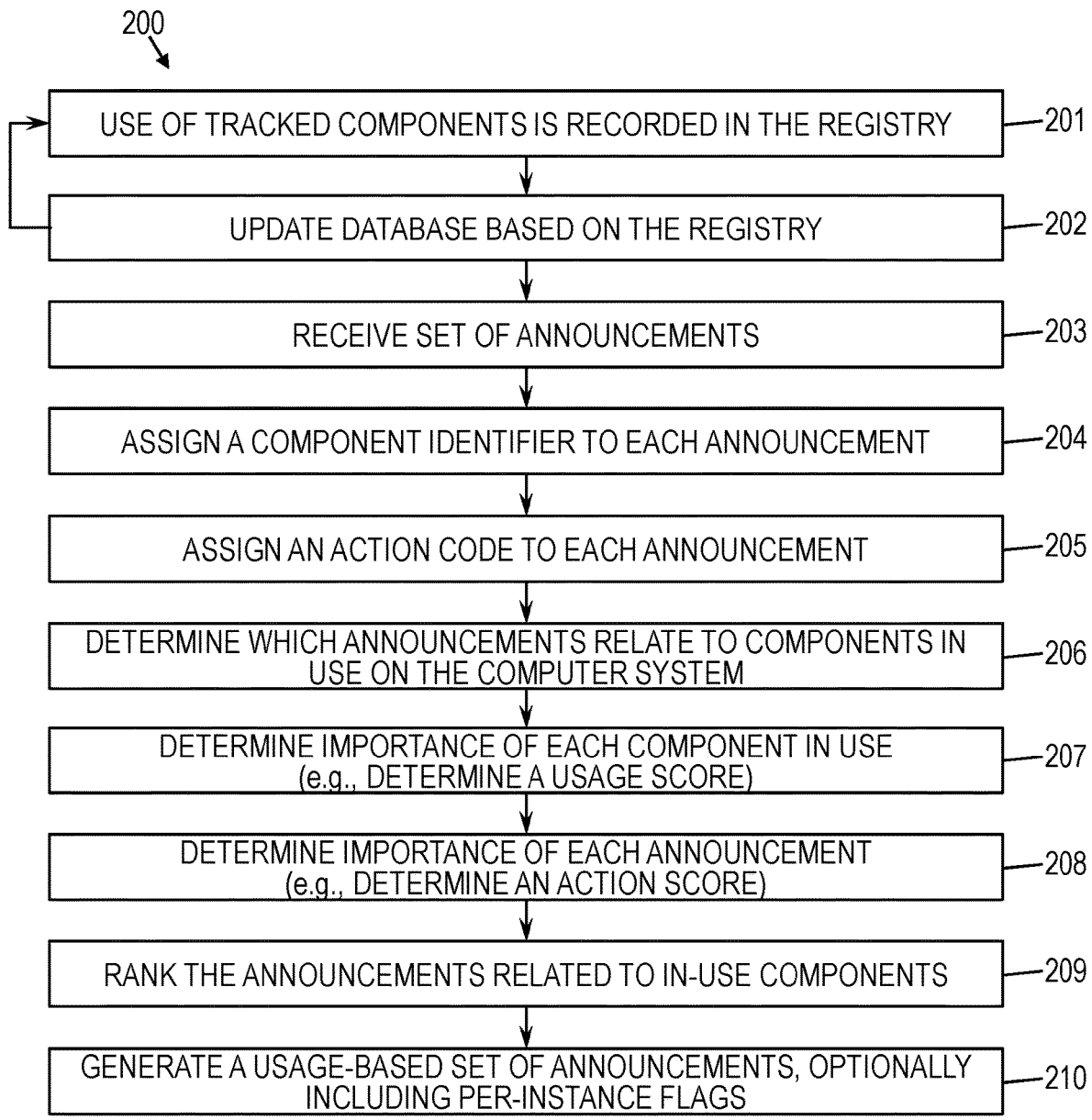
FIG. 2 is a flow diagram of a method of customizing product announcements, according to some embodiments of this invention.

FIG. 2 is a flow diagram of a method 200 of customizing product announcements based on product usage, according to some embodiments of this invention. It will be understood that this method 200 is an example and does not limit the scope of embodiments of the invention. As shown in FIG. 2, at block 201, during normal usage of the computer system 120, tracked components 140 of a product 150 are used, and this use is recorded in the registry 170.

At block 202, the database 130 is updated based on the registry 170, to indicate usage of tracked components 140. Updating the database 130 may occur from time to time, based on various criteria. For instance, the customization system 100 may monitor the registry 170 and may automatically update the database 130 upon receiving an indication that a new usage of a tracked component 140 has occurred. For another example, the customization system 100 may periodically update the database 130 at intervals, to indicate uses of the tracked components 140 that have occurred since the last update.

In some embodiments of the invention, the activities of updating the registry 170 based on usage and updating the database 130 based on the registry are ongoing. In FIG. 2, this is shown by the arrow that extends from block 202 back to block 201.

At block 203, a set of announcements is received at the announcement vehicle 110. The set of announcements may include a plurality of individual announcements, or announcement records. This received set of announcements may have been issued by a vendor and transmitted from a server 160 associated with the vendor. In some embodiments of the invention, the announcement vehicle 110 includes an artificially intelligent tool that analyzes the received set of announcements in view of information stored in the database 130 to generate a usage-based set of announcements that is based on the received set of announcements. The usage-based set of announcements may be a summary, or reduced version, of the received set of announcements in a form that is customized based on product usage.

At block 204, the announcement vehicle 110 may assign to each announcement record, in the received set of announcements, at least one component identifier. The assigned component identifier may identify a component 140 to which the announcement relates. Each component 140 may already have one or more identifiers, which may have been established by the developer, such as a name or other string. It is likely the case that a component identifier appears in an announcement that relates to the associated component 140. Thus, to assign a component identifier to an announcement, the announcement vehicle 110 may search for a component identifier in the announcement itself and may assign to the announcement a component identifier that is found. If an announcement is associated with metadata, that metadata may identify a related component 140, and in that case, the announcement vehicle 110 may extract component identifiers from the metadata.

At block 205, the announcement vehicle 110 may assign to each announcement record an action code or action identifier. The action code may be based on the activity that is occurring with respect to the component 140 at issue in the announcement. For example, and not by way of limitation, there may be a distinct action code for each of the following actions that may be described in announcements: add or create a new component 140, enhance a component 140, reduce functionality of a component 140, alter a component 140, or delete a component 140. In the case of adding a new component 140, the component identifier assigned to the announcement, as described above, may be the identifier of the component 140 deemed most closely related to the new component 140 being added. Various techniques can be used to determine which action code to assign to an announcement. For example, and not by way of limitation, the announcement vehicle may have access to a set of keywords, where each keyword maps to a specific action code. For instance, the keyword "deprecate" may map to the action code for "delete." Upon identifying one or more keywords in the announcement, the announcement vehicle may select the action code that corresponds to (i.e., is mapped to) more of the keywords than any other action code. For another example, natural language processing may be applied to the announcement to determine which action code is most appropriate. For yet another example, if an announcement is associated with metadata, then an action code may be indicated in the metadata, and in that case, the announcement vehicle 110 may extract the action code and assign it as needed.

At block 206, the announcement vehicle 110 determines which announcement records relate to components 140 that are in use. Whether a component 140 is in use can be defined in various ways. For example, and not by way of limitation, a component 140 may be deemed in use if it has been used at least once within a preestablished period of time, such as one year; a component 140 may be deemed in use if it has been used at least a preestablished number of times within a preestablished period of time, such as at least five times in the past year; or a component 140 may be deemed in use if it has been used at least once within a first preestablished period of time or at least a preestablished number of times within a second preestablished period of time, such as at least once within the past three months or at least three times within the past year.

Given a definition of "in use," the announcement vehicle 110 may determine which components 140 are in use based on the database 130. As discussed above, a component record in the database 130 may include information about the usage history of the associated component 140. More specifically, the usage history maintained may be appropriate information to determine whether the associated component 140 is in use. For instance, if the definition of use is based on frequency within the past year, then the database 130 may maintain, for each tracked component 140, an indication of use frequency within the past year. Thus, the announcement vehicle 110 may determine which components 140 are in use based on the database 130. More specifically, the announcement vehicle may compare the component identifier of each announcement record to the component records in the database 130 to determine which announcements relate to components 140 that are in use. As such, the announcement vehicle 110 may divide the announcement records into two sets: a first set that relates to components 140 in use, and a second set that relates to components 140 that are not in use.

At block 207, the announcement vehicle determines an importance of each component 140 that is in use and referenced in the announcements. In some embodiments of the invention, the importance is simply the time since last use, or the importance of a component 140 is otherwise based on how recently that component 140 was used. For another example, however, importance may be based on a combination of one or more of the following: last use, use frequency, and number of instances in use. In some embodiments of the invention, importance is given in the form of a usage score, which may be calculated according to a scoring algorithm. For example, and not by way of limitation, the usage score of a component 140 may be a weighted combination of minutes since last usage, number of uses within the last six months, and number of instances in use. It will be understood, however, that various scoring algorithms may be used.

In some embodiments of the invention, given the definition of importance being used, the database 130 maintains appropriate information about each tracked component 140 to enable importance to be calculated. For instance, if importance is based on a combination of most recent use and use frequency within the last year, then both of these values may be maintained in the database 130. Thus, based on information in the database 130, the announcement vehicle 110 may determine an importance of each component 140 in use and reference in the announcements.

At block 208, the announcement vehicle 110 determines an importance of each announcement record related to a component 140 that is in use. It will be understood that various mechanisms may be used to determine the importance of announcement records. For example, and not by way of limitation, an action score may represent importance, and actions scores may be based on action codes. As such, an action code that suggests a level of urgency (e.g., deleting a component 140) may be given higher importance that an action code that has lesser urgency (e.g., adding a new component 140). Thus, having assigned an action code to each announcement record, the announcement vehicle 110 may map that action code to a respective importance, or action score, of the announcement record.

At block 209, the announcement vehicle 110 ranks, or sorts, the announcement records that relate to in-use components 140. This ranking may be based on a combination of the importance of the in-use components 140 and the importance of the announcement records themselves. In other words, for instance, the ranking may be based on the usage scores of the in-use components 140 combined with the action scores of the announcement records themselves. For example, an announcement record with high importance (e.g., with an action code that suggests urgency) that relates to a component 140 with high importance (e.g., a frequently used component 140) may be ranked highly, while an announcement record with low importance (e.g., with an action code that suggests no urgency) that relates to a component 140 with low importance (e.g., a component that was used once, long ago) may be ranked substantially lower. In some embodiments of the invention, the importance of components 140 and announcement records are respectively represented by usage scores and action scores, and a final ranking score of an announcement record is a weighted average of the action score of the announcement record itself and the usage score of the component 140 to which it relates. Thus, having established the various importance levels, the announcement vehicle 110 may determine a ranking score for each announcement record. This scoring may implicitly result in a ranking according to these ranking scores. In some embodiments of the invention, the ranking of announcement records represents a prioritization that is customized to the user's actual usage of the components 140 referenced in the announcements.

At block 210, the announcement vehicle 110 generates a usage-based set of announcements based, at least in part, on the received set of announcements and on the scores or rankings established above. For instance, in some embodiments of the invention, the announcement records that relate to in-use components 140 may be sorted according to their respective ranking scores. In some embodiments of the invention, the usage-based set of announcements includes a flag or other indication of which components 140 referenced in the announcement records relate to which instances of the product 150. For example, and not by way of limitation, each instance may have an instance identifier, such as an integer or a string. The identifier of an instance may appear in the usage-based announcements in association with each announcement record related to a component 140 in use in that instance. Further, if the user has previously indicated a level of importance of each instance, then an announcement record related to a component 140 in use in an instance with at least a threshold level of importance may be flagged or otherwise emphasized to indicate a relationship to an important instance of the product 150.

After all of the announcement records relating to in-use components 140, the remaining announcement records may follow. If included, these other announcement records need not be sorted. Alternatively, the announcement records relating only to components 140 that are not in use may be excluded from the usage-based set of announcements. However, if the announcements records relating only to components 140 not in use are excluded, then the usage-based set of announcements may include a link to a location where the remaining announcements can be viewed. It will be understood that various techniques, or combinations of techniques, may be used to generate the user-based set of announcements based on the activities described above.

In some embodiments of the invention, the announcement records of components 140 in use are grouped according to action code. For instance, this can be the case if the announcement vehicle 110 sorts, at a first level, based on action score and then, at a second level, based on usage score. In this case, announcement records with critical action codes (e.g., delete) appear first, and announcement records with less critical action codes (e.g., add) appear later or last. Within these groups defined by action code, the announcement records may be further sorted based on usage score. For example, and not by way of limitation, this dual-level sorting may be achieved based on using ranking scores as described above, where the weighting of action scores within the ranking score is a degree of magnitude larger than the weighting of usage scores. Alternatively, however, this grouping can be achieved without the use of ranking scores, such as by sorting according to two levels as described above.

In some embodiments of the invention, the announcement vehicle 110 groups announcement records that relate to a common component 140. For instance, if a first announcement record is ranked higher than a second announcement record related to the same component 140, then the second announcement record may be placed just after the first announcement record, potentially coming before announcement records that are ranked higher than it. In this manner, the user can expect to find announcements for a single component 140 collected together for convenience.

In some embodiments of the invention, the usage-based set of announcements includes one or more scores or importance explanations associated with each announcement record. This can be useful, for example, if the customer is not aware of which components 140 are in use and how frequently they are in use. For instance, along with each announcement record, the announcement vehicle 110 may display an indication of the usage score and an indication of the action score. These need not be displayed as numerical values but instead, for example, may be displayed as an explanatory phrase or may be represented as color-coding. For instance, the usage scores and action scores may each be divided into one or more ranges, where each range maps to a respective explanatory phrase or color. For example, the highest range of usage scores may be associated with a phrase such as "highest usage," and announcement records related to components 140 with usage scores in this range may include this phrase or may be color-coded according to the respective range. Thus, a user may be conveniently notified of why each announcement record is important to the user's organization.

Further, in some embodiments of the invention, the usage-based set of announcements may be provided in the form of simply a summary or table, which includes one or more of the following: the component identifier of the related component 140, an identifier of a computing device utilizing the related component 140, the action code, an indication of usage score, and an indication of action score. This can enable the user to quickly determine the relevance of each announcement record. Further, the usage-based set of announcements may include embedded links, enabling the user to select a link and thereby cause the display of a full announcement associated with the link selected.

Thus, as described in detail above, embodiments of the customization system 100 prioritize announcements about changes that apply to the specific customer's current usage model. Announcements related to components 140 not in use may be positioned after those related to components 140 in use, thus enabling the user to focus on functionality that has relevance to the user's operations.

Figure 3:
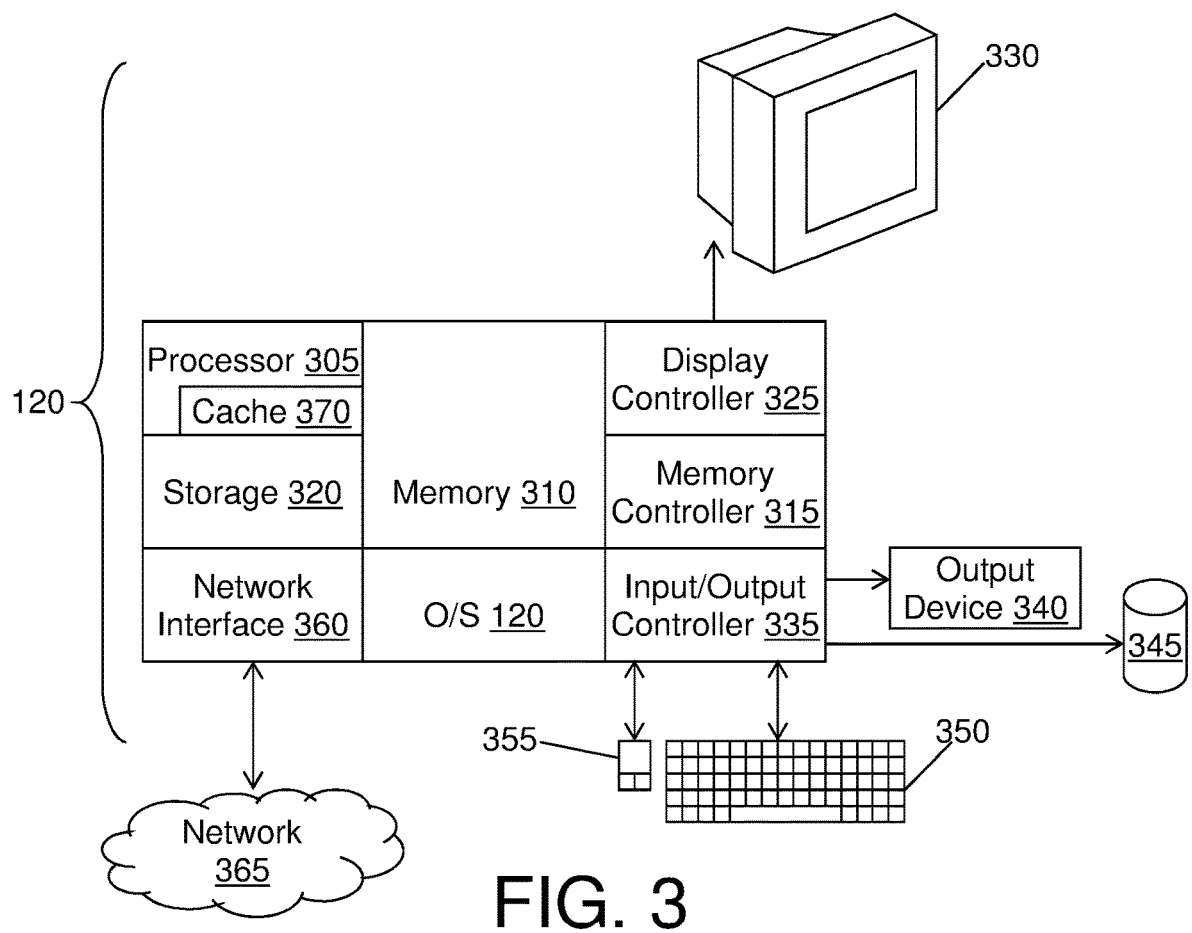
FIG. 3 is a block diagram of a computer system for implementing some or all aspects of the customization system, according to some embodiments of this invention.

FIG. 3 is a block diagram of a computer system 120 for implementing some or all aspects of the customization system 100, according to some embodiments of this invention. The customization systems 100 and methods described herein may be implemented in hardware, software (e.g., firmware), or a combination thereof. In some embodiments, the methods described may be implemented, at least in part, in hardware and may be part of the microprocessor of a special or general-purpose computer system 120, such as a personal computer, workstation, minicomputer, or mainframe computer.

In some embodiments, as shown in FIG. 3, the computer system 120 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 120, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the customization systems 100 and methods of this disclosure.

The computer system 120 may further include a display controller 325 coupled to a display 330. In some embodiments, the computer system 120 may further include a network interface 360 for coupling to a network 365. The network 365 may be an IP-based network for communication between the computer system 120 and an external server, client and the like via a broadband connection. The network 365 transmits and receives data between the computer system 120 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Customization systems 100 and methods according to this disclosure may be embodied, in whole or in part, in computer program products or in computer systems 120, such as that illustrated in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   tracking, by a processor, usage history of a plurality of components of one or more products, the plurality of components being operated on one or more customer computer systems;
   receiving an original set of announcements about the one or more products, wherein the original set of announcements comprises a plurality of announcement records;
   prioritizing the plurality of announcement records based on the usage history of the plurality of components;
   generating a usage-based set of announcements based on the prioritization of the plurality of announcement records, wherein the usage-based set of announcements include an action comprising a link that provides access to at least one of an upgrade or an uninstall for a product in the one or more products;
   receiving a selection of the link for performing the at least one of the upgrade or the uninstall for the product;
   performing the at least one of the upgrade or the uninstall for the product based on the link selection;
   transmitting the usage-based set of announcements to at least one customer computer system, wherein the usage-based set of announcements comprise one or more scores indicating an importance of each usage-based announcement in the usage-based set of announcements, and wherein the usage-based set of announcements comprises a table comprising:
      a first set of columns comprising a component identifier column, a computing device identifier column, an action code column, and a usage score column for the one or more scores, wherein the usage-based set of announcements comprises another link, wherein, upon selection of the another link, a full announcement associated with the another link is displayed; and
   performing dual-level sorting of the plurality of announcement records which comprises sorting at a first level the plurality of announcement records according to the action score and sorting at a second level the plurality of announcement records according to the usage score, wherein the action score is given a greater weight than the usage score.

2. The computer-implemented method of claim 1, wherein the prioritizing the plurality of announcement records based on the usage history of the plurality of components is further based on at least one of respective use frequency of each of the plurality of components and respective recent usage of each of the plurality of components.

3. The computer-implemented method of claim 1, further comprising:
   assigning a respective action code to each announcement record in the plurality of announcement records;
   wherein the prioritizing the plurality of announcement records is further based on the respective action code of each announcement record.

4. The computer-implemented method of claim 1, wherein the tracking the usage history of the plurality of components of the one or more products comprises generating a database based on a registry, wherein each use of each component of the plurality of components is recorded in the registry.

5. The computer-implemented method of claim 1, wherein:
   the tracking usage history of the plurality of components of one or more products comprises tracking the usage history of a set of components of a plurality of product instances of a first product; and
   the usage-based set of announcements comprise, in association with a first announcement record in the plurality of announcement records, a flag identifying one or more product instances to which the announcement record relates.

6. The computer-implemented method of claim 1, further comprising:
   dividing the plurality of announcements into a first set of announcements related to a first set of components that are in use and a second set of announcements related to a second set of components that are not in use;
   wherein the generating the usage-based set of announcements comprises positioning the first set of announcements before the second set of announcements, based on the first set of announcements being related to the first set of components that are in use.

7. The computer-implemented method of claim 1, further comprising:
   dividing the plurality of announcements into a first set of announcements related to a first set of components that are in use and a second set of announcements related to a second set of components that are not in use;
   wherein the generating the usage-based set of announcements comprises excluding from the usage-based set of announcements the second set of announcements related to the second set of components that are not in use.

8. The computer-implemented method of claim 1, wherein the plurality of announcement records appear in a different order in the usage-based set of announcements as compared to the original set of announcements.

9. The computer-implemented method of claim 1, wherein a first announcement record is ranked higher than a second announcement record of the plurality of announcement records, the first announcement record and the second announcement record both being for a same component of the plurality of components;
   further comprising placing the second announcement record immediately after the first announcement record so as to be placed before other announcement records ranked higher than the second announcement record.

10. A system comprising:
    a memory having computer-readable instructions; and
    one or more processors for executing the computer-readable instructions, the computer-readable instructions comprising instructions for:
      tracking usage history of a plurality of components of one or more products, the plurality of components being operated on one or more customer computer systems;
      receiving an original set of announcements about the one or more products, wherein the original set of announcements comprises a plurality of announcement records;
      prioritizing the plurality of announcement records based on the usage history of the plurality of components;
      generating a usage-based set of announcements based on the prioritization of the plurality of announcement records, wherein the usage-based set of announcements include an action comprising a link that provides access to at least one of an upgrade or an uninstall for a product in the one or more products;
      receiving a selection of the link for performing the at least one of the upgrade or the uninstall for the product;
      performing the at least one of the upgrade or the uninstall for the product based on the link selection;
      transmitting the usage-based set of announcements to at least one customer computer system, wherein the usage-based set of announcements comprise one or more scores indicating an importance of each usage-based announcement in the usage-based set of announcements, and wherein the usage-based set of announcements comprises a table comprising:
        a first set of columns comprising a component identifier column, a computing device identifier column, an action code column, and a usage score column for the one or more scores, wherein the usage-based set of announcements comprises another link, wherein, upon selection of the another link, a full announcement associated with the another link is displayed; and
      performing dual-level sorting of the plurality of announcement records which comprises sorting at a first level the plurality of announcement records according to the action score and sorting at a second level the plurality of announcement records according to the usage score, wherein the action score is given a greater weight than the usage score.

11. The system of claim 10, wherein the prioritizing the plurality of announcement records based on the usage history of the plurality of components is further based on at least one of respective use frequency of each of the plurality of components and respective recent usage of each of the plurality of components.

12. The system of claim 10, the computer-readable instructions further comprising instructions for:
    assigning a respective action code to each announcement record in the plurality of announcement records;
    wherein the prioritizing the plurality of announcement records is further based on the respective action code of each announcement record.

13. The system of claim 10, wherein the tracking the usage history of the plurality of components of the one or more products comprises generating a database based on a registry, wherein each use of each component of the plurality of components is recorded in the registry.

14. The system of claim 10, the computer-readable instructions further comprising instructions for:
    dividing the plurality of announcements into a first set of announcements related to a first set of components that are in use and a second set of announcements related to a second set of components that are not in use;
    wherein the generating the usage-based set of announcements comprises positioning the first set of announcements before the second set of announcements, based on the first set of announcements being related to the first set of components that are in use.

15. A computer-program product for customizing product announcements, the computer-program product comprising a computer-readable storage medium having program instructions embodied therewith, the program instructions executable by a processor to cause the processor to perform a method comprising:

tracking usage history of a plurality of components of one or more products, the plurality of components being operated on one or more customer computer systems;

receiving an original set of announcements about the one or more products, wherein the original set of announcements comprises a plurality of announcement records;

prioritizing the plurality of announcement records based on the usage history of the plurality of components;

generating a usage-based set of announcements based on the prioritization of the plurality of announcement records, wherein the usage-based set of announcements include an action comprising a link that provides access to at least one of an upgrade or an uninstall for a product in the one or more products;

receiving a selection of the link for performing the at least one of the upgrade or the uninstall for the product;

performing the at least one of the upgrade or the uninstall for the product based on the link selection;

transmitting the usage-based set of announcements to at least one customer computer system, wherein the usage-based set of announcements comprise one or more scores indicating an importance of each usage-based announcement in the usage-based set of announcements, and wherein the usage-based set of announcements comprises a table comprising:

a first set of columns comprising a component identifier column, a computing device identifier column, an action code column, and a usage score column for the one or more scores, wherein the usage-based set of announcements comprises another link, wherein, upon selection of the another link, a full announcement associated with the another link is displayed; and performing dual-level sorting of the plurality of announcement records which comprises sorting at a first level the plurality of announcement records according to the action score and sorting at a second level the plurality of announcement records according to the usage score, wherein the action score is given a greater weight than the usage score.

16. The computer-program product of claim 15, wherein the prioritizing the plurality of announcement records based on the usage history of the plurality of components is further based on at least one of respective use frequency of each of the plurality of components and respective recent usage of each of the plurality of components.

17. The computer-program product of claim 15, the method further comprising:

assigning a respective action code to each announcement record in the plurality of announcement records;

wherein the prioritizing the plurality of announcement records is further based on the respective action code of each announcement record.

18. The computer-program product of claim 15, wherein the tracking the usage history of the plurality of components of the one or more products comprises generating a database based on a registry, wherein each use of each component of the plurality of components is recorded in the registry.

19. The computer-program product of claim 15, the method further comprising:

dividing the plurality of announcements into a first set of announcements related to a first set of components that are in use and a second set of announcements related to a second set of components that are not in use;

wherein the generating the usage-based set of announcements comprises positioning the first set of announcements before the second set of announcements, based on the first set of announcements being related to the first set of components that are in use.

\* \* \* \* \*